(12) United States Patent
Guerra et al.

(10) Patent No.: US 12,556,634 B1
(45) Date of Patent: Feb. 17, 2026

(54) TRIGGERING USER INTERACTION WORKFLOWS OVER AN ALTERNATIVE CHANNEL

(71) Applicant: UIPCO, LLC, San Antonio, TX (US)

(72) Inventors: Oscar Guerra, San Antonio, TX (US); Jennifer Hunt Erickson, San Antonio, TX (US); Faith Catherine Platz, Dallas, TX (US); Jeorge Luis Fabre, San Antonio, TX (US); Noe Alberto Martinez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 285 days.

(21) Appl. No.: 18/345,542

(22) Filed: Jun. 30, 2023

(51) Int. Cl.
  *H04M 3/527* (2006.01)
  *H04M 3/523* (2006.01)

(52) U.S. Cl.
  CPC ......... *H04M 3/527* (2013.01); *H04M 3/5238* (2013.01)

(58) Field of Classification Search
  None
  See application file for complete search history.

(56) References Cited

U.S. PATENT DOCUMENTS

| | | | |
|---|---|---|---|
| 10,171,657 B1 * | 1/2019 | Anandadoss | H04L 65/403 |
| 11,102,352 B2 * | 8/2021 | West | H04M 7/0027 |
| 2013/0094647 A1 * | 4/2013 | Mauro | H04M 3/5141 |
| | | | 379/265.09 |
| 2015/0010134 A1 * | 1/2015 | Erel | H04M 3/4936 |
| | | | 379/88.01 |
| 2019/0037077 A1 * | 1/2019 | Konig | H04M 3/5183 |
| 2020/0193447 A1 * | 6/2020 | Jaiswal | H04M 3/5191 |
| 2023/0254403 A1 | 8/2023 | Casal et al. | |

* cited by examiner

*Primary Examiner* — Nafiz E Hoque
(74) *Attorney, Agent, or Firm* — Potomac Law Group, PLLC; Dannon G. Allbee (57) ABSTRACT

Aspects of the present disclosure are directed to receiving a user phone call and triggering user interactions via an alternative channel in response to the user phone call. Users may call an account service provider with issues related to a user account. To service such a call, the account service provider may prompt the user for information. This information can be analyzed to determine whether the conditions for the user's call are aligned with a shift to a more efficient alternative channel. For example, a guided user workflow via a webpage, application, chat agent, etc. may represent a more efficient deployment of organizational resources. When such conditions are aligned, the account service provider may trigger a selected user interaction workflow for the user call via an alternative channel. The user interaction workflow can comprise a guided workflow that is configured to resolve the user's issue related to the call.

20 Claims, 8 Drawing Sheets

TRIGGERING USER INTERACTION WORKFLOWS OVER AN ALTERNATIVE CHANNEL

TECHNICAL FIELD

The present disclosure is directed to triggering user interactions via an alternative channel.

BACKGROUND

Users can interact with a service provider via a variety of different channels. For example, users can initiate telephone calls, chat sessions, or simply perform a series of electronic actions to accomplish a task. The channels that users choose to leverage to interact with service provides can have a large impact on how these service providers deploy and/or utilize systems resources. For example, some interaction channels can consume a larger quantity of resources than others. Further, when user selections create an imbalance or otherwise overload a given interaction channel, the users' experience with these services providers can be negatively impacted.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to receiving a user phone call and triggering user interactions via an alternative channel in response to the user phone call. Users may call an account service provider with questions or issues related to the user's account with the service provider. To service such a call, the account service provider may implement a user interaction manager that prompts the user for information. This information can be analyzed to determine whether the conditions for the user's call are aligned with a shift to a more efficient alternative channel. For example, a guided user workflow via a webpage, native application, web application, chat agent, or other suitable automated workflow may represent a more efficient deployment of the account service provider's resources. When such conditions are aligned, the user interaction manager may trigger a selected user interaction workflow for the user call via an alternative channel. The user interaction workflow can comprise a guided workflow that is configured to resolve the user's issue related to the call. When performance of the workflow successfully resolves the user's issue, interactions with the user can end. This supports a more efficient utilization of the account service provider's organizational resources. When performance of the workflow does not successfully resolve user's issue, a call with the user can be resumed and/or reinitiated to support resolution of the user's issue.

In some implementations, account service providers (e.g., bank account, credit card account, investment account, retirement account, any other suitable financial user account, or any other suitable user account) can detect conditions to shift user calls to more efficient communication channels and trigger user interaction workflow(s) to resolve the user issues. A user interaction manager can receive a phone call from a user (e.g., account holder) to resolve an issue. The user can provide the user interaction manager input (e.g., user utterances), such as in response to prompts or questions. The input can be processed using one or more machine learning models to understand a context for the phone call, such as a user intent, issue type, user disposition with respect to the issue, complicating factors relevant to the issue, and other suitable context. This context can be used to detect conditions that are conducive to issue resolution via an alternative channel (e.g., webpage-based channel, application-based channel, automated chat channel, etc.).

For example, the user interaction manager can select a user interaction workflow via an alternative channel (e.g., a channel other than the live phone call) based on the context (e.g., user intent, issue type, complicating factors, etc.). User interaction workflows can be guided user workflow(s) configured to resolve issue(s) that fall into a given issue type or configured to otherwise address a user's intent. The guided user workflows can be webpage-based workflows (e.g., guided via a website and web functionality), application-based workflows (e.g., guided via a native application and web application functionality), automated chat workflows (e.g., guided via a chatbot), any other suitable electronically guided user workflow, or any combination thereof. Different workflows can be configured to guide the user through different user functions, such as changes to the user's account, adding/creating a new account, etc. The user interaction manager can select the guided workflow from among multiple guided workflows based on the context for the call, user history, account history, and the like.

In some implementations, the user interaction manager can calculate a resolution metric for the user, selected user interaction workflow, and determined issue type, for example using a user history (e.g., user account history, user training history, etc.) and/or the user intent. The resolution metric can represent the likelihood the call issue is resolved when the particular user performs the particular selected user interaction workflow. The resolution metric can be compared to a resolution criteria (e.g., probability threshold) and the user can be prompted to accept the selected user interaction workflow via an alternative channel when the resolution metric meets the resolution criteria.

The user prompt to accept the selected user interaction workflow can include one or more timing components. For example, the user can be offered at least two options: the option to hold for a live agent with an estimated wait time or call back time of 'X'; and the option to resolve the issue via the selected user interaction workflow with an estimated resolution time of 'Y'. In this example, the 'X' time may be longer than the 'Y' time during high call volume periods. In addition, the user may be informed that the user's hold/wait status (e.g., hold time or call back wait time) will be maintained while the user performs the selected user interaction workflow. Accordingly, when the performed workflow is successful at resolving the user's issue, the user can save time and when the performed workflow is unsuccessful at resolving the user's issue the user will maintain the same hold/wait time. In some implementations, the user may be offered a priority hold/wait time if completion of the selected user interaction workflow does not resolve the issue. For example, the option to resolve the issue via the selected user interaction workflow may include an immediate or prioritized connection with a live agent (e.g., call back) if successful completion of the selected user interaction workflow does not resolve the issue.

In response to the user accepting the proposed user interaction workflow (e.g., via input that accepts the option), the user interaction manager can transition the interaction with the user from a telephone call to the alternative channel. For example, the call can be disconnected or placed on a long-term hold (e.g., hold without interaction with the user) until completion of the accepted user interaction workflow via the alternative channel.

Conventional service providers handle inefficient resource utilization caused by user actions by scaling resources and/or providing alternative channels to users. Scaling resources simply secures a larger quantity of resources, but still suffers from inefficient use. Even when conventional service providers provide alternative channels, they fail to effectively detect user call conditions that will be effectively resolved via the alternative channels. Implementations disclosed herein detect opportunities to shift user interactions to more efficient channels so that the organization's computing resources are effectively deployed and utilized. For example, users that implement account changes and/or resolve account issues via an online channel (e.g., interactions with a website, web application, and/or native application) can effectively utilize organizational resources. On the other hand, users that rely on telephone calls when an online channel options is available can cause inefficient resource utilization. For example, the user call may require: live agent interactions; equipment for the live agent to input data, navigate a user interface of an application, etc.; logs of the user call that inflate the user's stored profile with respect to the organization; etc. On the other hand, the online channel account change/resolution can be accomplished via interactions with the user's client device (e.g., smartphone, tablet, laptop, etc.) and cloud device(s) affiliated with the service provider. Such cloud device(s) can be efficiently scaled, and can include automated techniques to store and/or process the user's account change/resolution in a manner that more effectively utilizes hardware.

For example, the server can execute a limited suite of software that processes input from the user's native/web application. This specialized server can more effectively utilize storage and computer processor resources as compared to a live agent's computer, which may be a client device that is required to interact with the live agent (e.g., desktop with a mouse, keyboard, microphone, etc., virtual desktop, and the like). In addition, a telephone call requires a live agent and a real-time communication channel that carries live voice data, whereas the server interactions can be accomplished with a lighter weight communication channel that does not include these real-time latency demands. Accordingly, the native/web application and server interactions are less burdensome on a service provider's network than are telephone calls between the user and a live agent.

Implementations perform user interaction workflows to resolve user issues via an efficient channel. These user interaction workflows can be triggered in response to detection that the user is attempting to utilize a less efficient channel (e.g., telephone call) to resolve an issue when the issue can be practically resolved via a more efficient channel. Implementations can trigger the user interaction workflow over an alternative channel (e.g., webpage channel, application channel, automated chat channel, etc.) that achieves a greater organizational resource efficiency. These user interaction workflows can effectively shift users to more efficient channels and create a more efficient and effective organizational system for managing and servicing user accounts.

Figure 1:
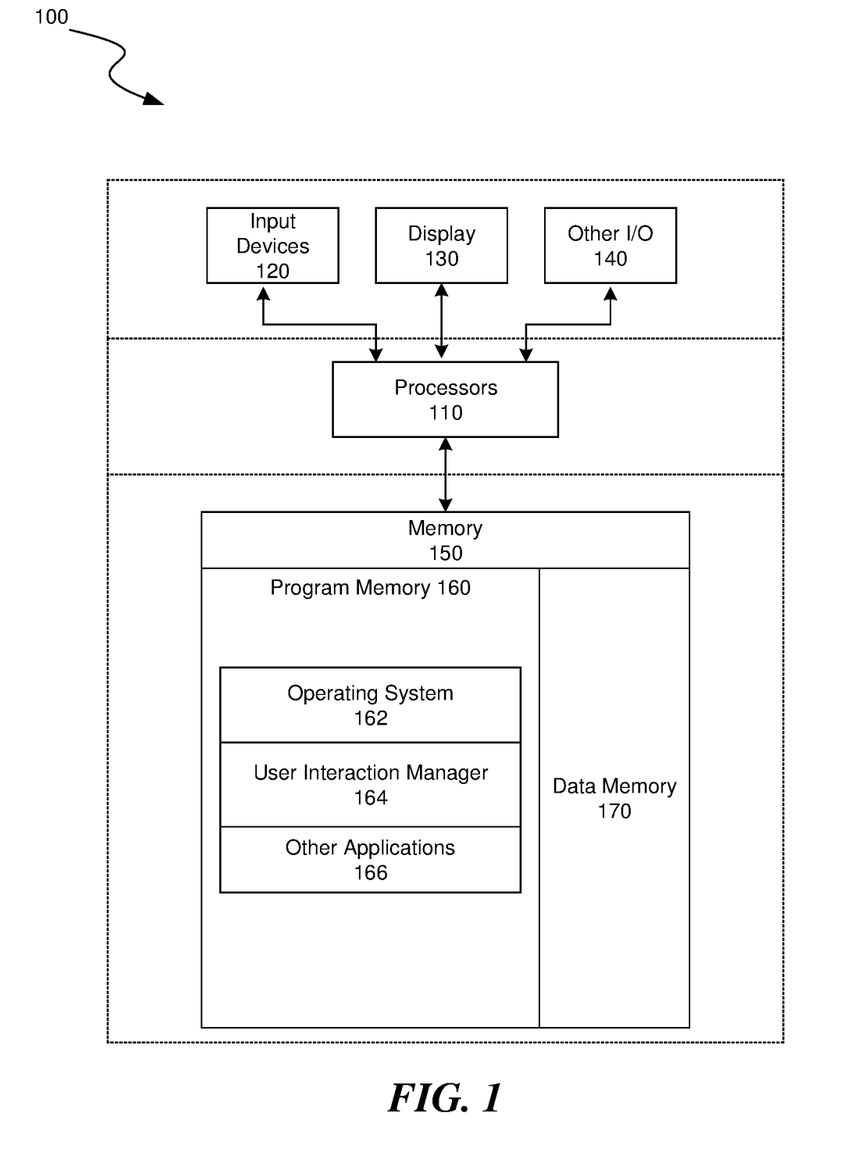
FIG. 1 is a block diagram illustrating an overview of devices on which some implementations can operate.

Several implementations are discussed below in more detail in reference to the figures. FIG. 1 is a block diagram illustrating an overview of devices on which some implementations of the disclosed technology can operate. The devices can comprise hardware components of a device 100 that trigger user interactions via an alternative channel. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, user interaction manager 164, and other application programs 166. Memory 150 can also include data memory 170, e.g., workflow data, user logs, accounts logs, transcribed data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
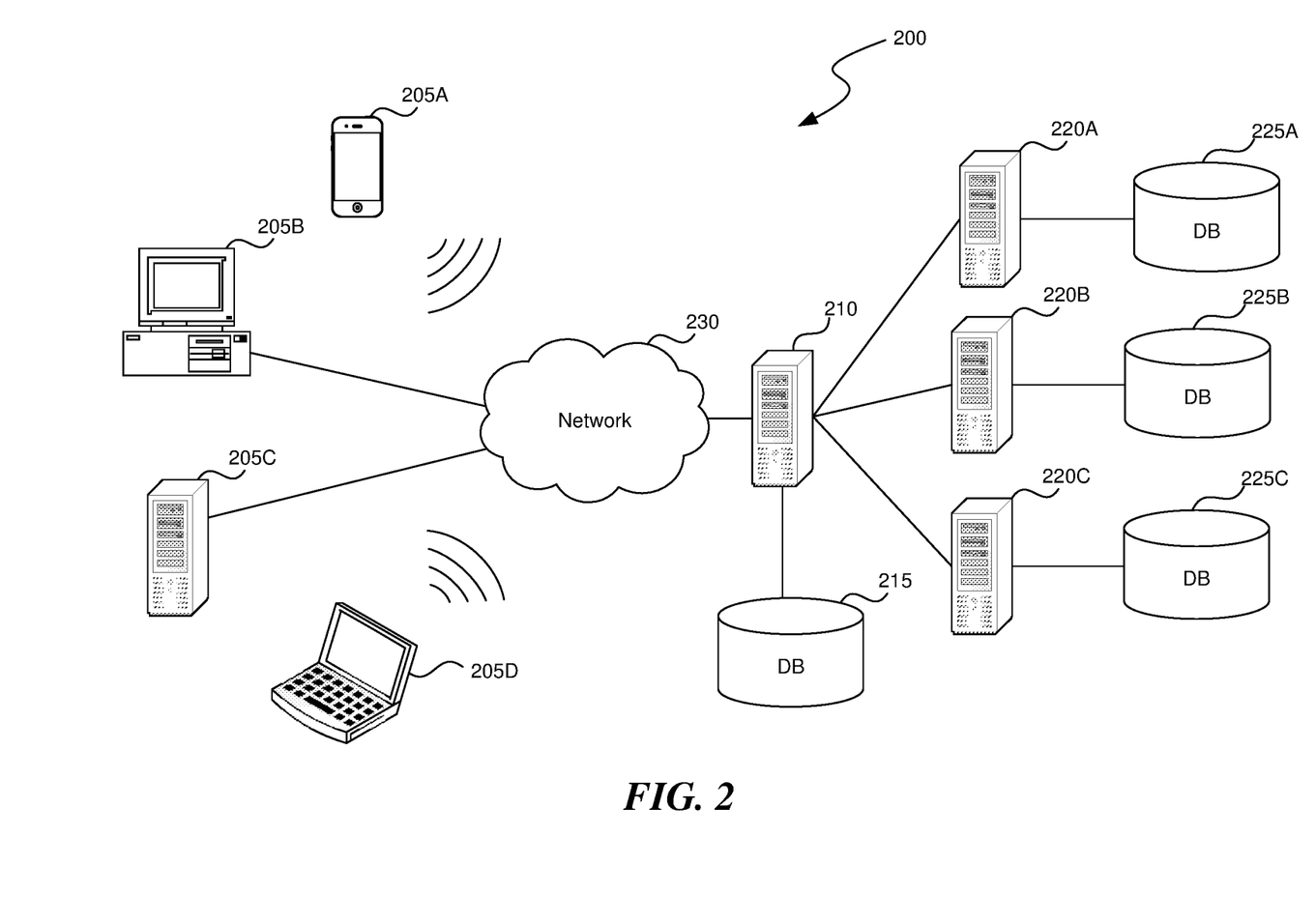
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as workflow data, user logs, accounts logs, transcribed data, configuration data, and any other suitable data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
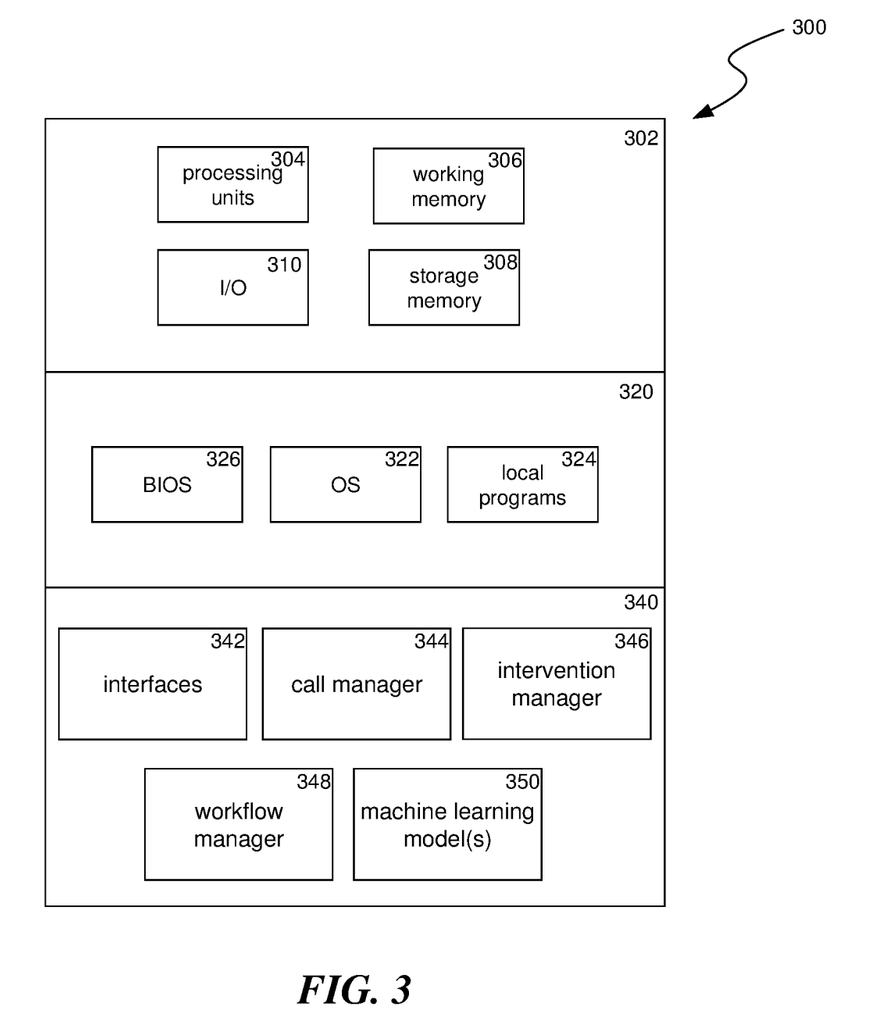
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include call manager 344, intervention manager 346, workflow manager 348, machine learning model(s) 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Call manager 344 can manage calls with users, such as receive incoming calls and provide an automated call workflow. For example, call manager 344 can be configured to receive an incoming telephone call from a user and execute a call workflow that prompts the user to provide user identifying information, user account information, and other information relevant to the user's intent for the call. Call manager 344 can include an automated agent (e.g., smart digital agent/assistant) configured to generate audio prompts (e.g., computer generated utterances) and provide the audio prompts via the received telephone call. Call manager 344 can communicate with machine learning model(s) 350 to understand input from the user via the telephone call (e.g., user speech) and provide audio prompts/responses to the user based on the understood input. Descriptions with reference to blocks 804, 806, 814, 816, and 826 of FIG. 8 further describe the functionality of call manager 344.

Intervention manager 346 can analyze call data (e.g., context, issue type, user intent, etc.) and/or user data (e.g., user account history, user training history, etc.), and, based on the analysis, trigger alternative channel user interaction(s). For example, intervention manager 346 can analyze the user information, user account information, and other information relevant to the user's intent for the call to determine a context for the call, such as an issue type for an issue the user intends to resolve or any other suitable user intent for the call. In some implementations, intervention manager 346 can communicate with machine learning model(s) 350 to perform the analyses.

For example, machine learning model(s) 350 can analyze call data (e.g., collected user utterances, user account information, user history, etc.) to determine the user intent, the issue type, or any other suitable call context. Intervention manager 346 can then select one or more alternative channel user interaction workflow(s) for the user/call. User interaction workflows can be guided user workflow(s) configured to resolve issue(s) that fall into a given issue type or configured to otherwise address a user's intent. The guided user workflows can be webpage-based workflows (e.g., guided via a website and web functionality), application-based workflows (e.g., guided via a native/web application and application functionality), automated chat workflows (e.g., guided via a chatbot), any other suitable electronically guided user workflows, or any combination thereof. In some implementations, the triggered alternative channel user interaction workflow(s) can shift user interactions to utilize resources more effectively. Descriptions with reference to blocks 808, 810, 812, and 814 of FIG. 8 further describe the functionality of intervention manager 346.

Workflow manager 348 can implement guided user interaction workflow(s) over alternative channels, such as application-based workflows, webpage-based workflows, automated chat workflows, and the like. The guided workflows can provide instructions that guide the user through a series of tasks or functions to perform user account functionality, such as via a web presence for the user account (e.g., website) or an application (e.g., native/web application) that implements interactions with the user account. A given user interaction workflow can be selected by intervention manager 346 such that performance of the given workflow resolves an issue that the user is calling about (e.g., an issue type derived from the user's intent for the call). Accordingly, performance of the given user interaction workflow by workflow manager 348 and the user can resolve user issue(s) without live agent interactions.

In some implementations, performance of the given user interaction workflow by workflow manager 348 and the user does not resolve the user's issue. In such scenarios, workflow manager 348 can initiate a live agent interaction for the user (or cause a live agent interaction with the user to be initiated), such as via the web presence for the user account (e.g., website), the application, a telephone call, or any other suitable means for accomplishing a live agent user interaction. The live agent interaction can be an audio call, video call, or any other suitable live agent interaction. In some implementation, workflow manager 348 can communicate with call manager 344 to connect the user to a live agent. Descriptions with reference to blocks 818, 820, 822, 824, and 826 of FIG. 8 further describe the functionality of workflow manager 348.

Machine learning model(s) 350 can be any machine learning model(s) suitable for analyzing call data (e.g., user utterances, user responses to prompts, etc.), user data (e.g., user history, computing device logs, etc.), user account data (e.g., user account status, user account history, user account changes, etc.), and the like. Machine learning model(s) 350 can include natural language processing models that receive user utterances (or a transcript of a user utterance) and execute a call/chat workflow based on the user utterances.

For example, the call/chat workflow can be a series of questions and/or prompts configured to determine a user's intent for a call (e.g., issue type for a user issue, user disposition towards the issue, other suitable call context, etc.). Machine learning model(s) 350 can navigate the call/chat workflow in combination with call manager 344. Machine learning models 350 can be supervised learning models, unsupervised learning models, or other models that can analyze call data, user data, user account data, and the like. Example machine learning model(s) 350 include neural networks (e.g., simple neural networks, recurrent neural networks, convolutional neural networks, etc.), natural language processing models, transformer models, encoder and decoder architecture models, and the like. Descriptions with reference to blocks 808, 810, and 812 of FIG. 8 further describe the functionality of machine learning model(s) 350.

A "machine learning model," as used herein, refers to a construct that is trained or configured using data set(s) (e.g., training data) to make predictions, provide probabilities for new data items (whether or not the new data items were included in the training data), generate new data, or perform any other suitable predictive function. For example, training data for supervised learning can include items with various parameters and an assigned classification or prediction value. A new data item can have parameters that a model can use to assign a classification to the new data item or predict a value. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

Figure 4:
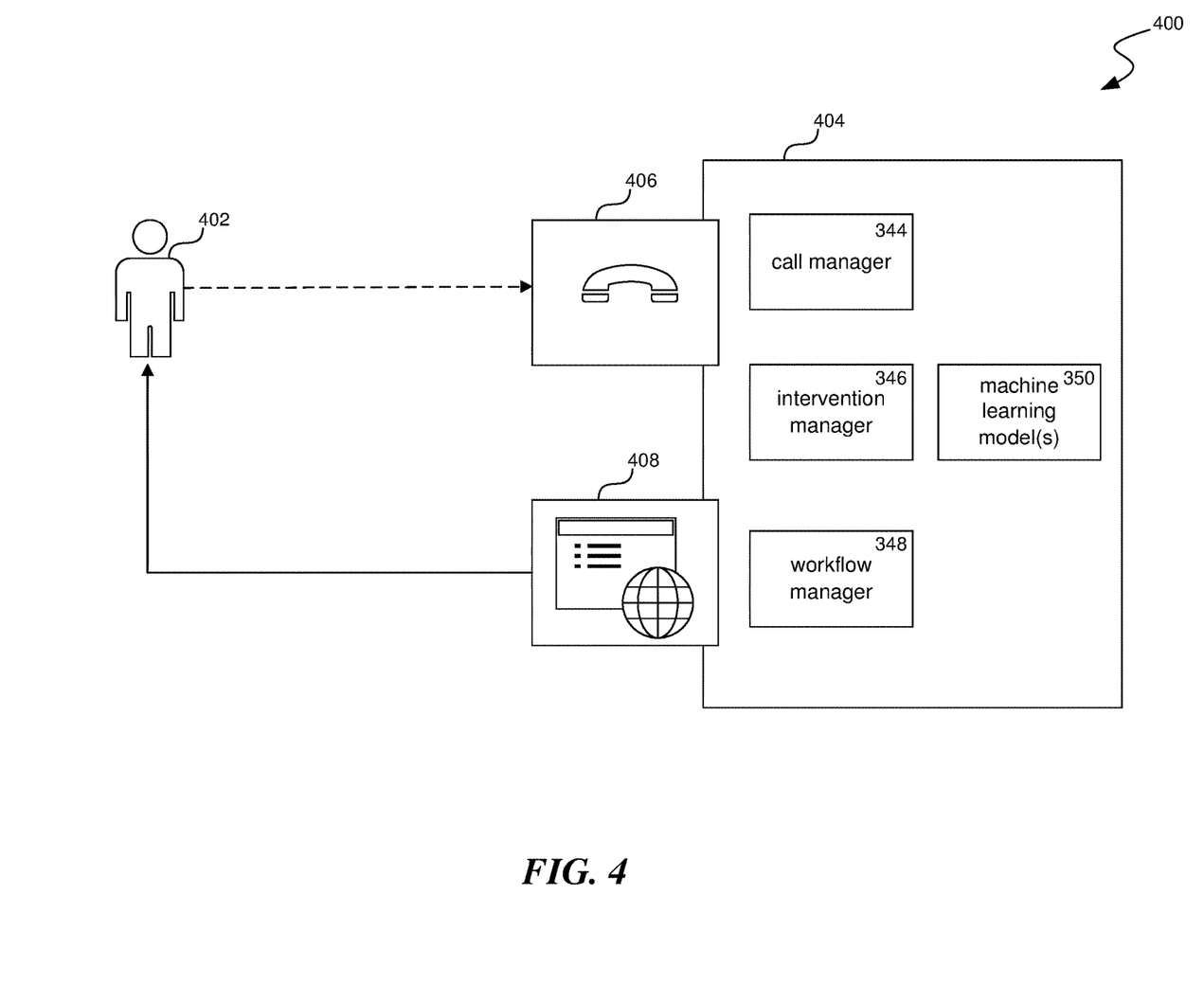
FIG. 4 is a conceptual diagram illustrating an incoming phone call that triggers an alternative channel user interaction.

In some implementations, account service providers (e.g., bank account, credit card account, investment account, retirement account, any other suitable financial user account, or any other suitable user account) can detect conditions to shift user requests to more efficient communication channels and trigger user interaction workflow(s) to resolve the user requests. FIG. 4 is a conceptual diagram 400 illustrating an incoming phone call that triggers an alternative channel user interaction. Diagram 400 includes call manager 344, intervention manager 346, workflow manager 348, and machine learning model(s) 350 from FIG. 3, in addition to user 402, account service provider 404, telephone channel 406, and alternative channel 408.

User 402 can be an account holder with account service provider 404. User 402 can by any suitable account holder, combination of account holders, etc. Account service provider can be a single service provider or multiple service providers configured to provide user 402 assistance with the user's account(s) (or provide the user other suitable services). User 402 can initiate a call with account service provider 404 via telephone channel 406. For example, user 402 may have an issue that the user is attempting to resolve via the phone call.

User 402 may perform the telephone call via any suitable client device (e.g., smartphone, smart home device, laptop, tablet, desktop, or any other suitable computing device). Account service provider 404 can receive the call via an automated call system and/or a live agent system. The automated call system and/or a live agent system can comprise any suitable hardware components, such as cloud computing devices, edge computing devices, telephone hardware, telephone system components, desktops, laptops, and the like.

In some implementations, call manager 344 can implement an automated call workflow to prompt input from user 402. The automated call workflow may be configured to: identify user 402, identify user account(s), determine an issue type for the issue user 402 is attempting to resolve, and/or obtain input representative of other suitable intent of user 402. In some implementations, call manager 344 can interact with machine learning model(s) 350 to perform the call workflow with user 402, such as a series of audio prompts and user 402 utterances in response.

Intervention manager 346 can determine a context for the call from user 402 using the call workflow information obtained by call manager 344, stored information about identified user 402, stored information about the identified account(s), and the like. Example context includes an issue type for a user issue associated with the call, user 402's disposition about the issue (e.g., angry, curious, neutral, etc.), additional factors other than the issue type that impact the user issue, other intent information with respect to user 402, and the like.

In some implementations, intervention manager 346 can interact with machine learning model(s) 350 to determine context for the call via telephone channel 406, such as the user intent, the issue type, and/or other factors that impact the user's issue. For example, call manager 344 can navigate a call workflow that prompts user 402 for granular information with respect to the issue user 402 is calling about, and machine learning model(s) 350 can compare the user utterances descriptive of the issue to one or more issue type templates (e.g., natural language descriptions, issue taxonomy, issue hierarchy, etc.) to identify a matching issue type. Intervention manager 346 can identify the issue type via any other suitable technique. In some implementations, machine learning model(s) 350 can predict the user's disposition with respect to the issue based on the user's utterances, volume, tone, and the like.

In some implementations, call manager 344, intervention manager 346, and machine learning model(s) 350 can operate in combination to navigate the call flow with user 402. For example, intervention manager 346 can access a history for user 402 and/or account history for the identified account(s). The history for user 402 and/or account history for the identified account(s) may indicate one or more user trends, for example: a high percentage of user 402's calls relate to a fraud alert; a high percentage of user 402's calls relate to international travel notice, a failed account update was recently attempted for one of the identified account(s), and the like. In some implementations, machine learning model(s) 350 can process the history for user 402 and/or account history (e.g., logs) to detect such trends. Intervention manager 346 and/or machine learning model(s) 350 can provide these potential issue types to call manager 344, and call manager 344 can explicitly ask user 402 whether the issue the user is calling about is one or more of these potential issues to determine the issue type.

In some implementations, intervention manager 346 can select a user interaction workflow for shifting the call with user 402 to alternative channel 408, such as a webpage-based channel, application-based channel, automated chat channel, and the like. For example, intervention manager 346 can select a user interaction workflow via alternative channel 408 from among a plurality of user interaction workflows based on the determined issue type, user 402's disposition about the issue, a stored history for user 402 (e.g., past issues user 402 has successfully resolved via webpage-based workflows, application-based workflows, automated chat workflows, etc.), a stored history for the identified user account(s), and any other suitable context.

In some implementations, the stored history for user 402 can be used to calculate a familiarity metric with one or more of alternative channel 408. For example, user 402's stored history may indicate high user account activity and/or a number of issues resolved via the webpage-based channel, however low user account activity and few or no issues resolved via the application-based channel. In this example, the familiarity metric may indicate that the user has high familiarity with the webpage-based channel and low familiarity with the application-based channel.

One or more rules can be defined that map issue types, user dispositions, user familiarity metrics, and other suitable context to user interaction workflows. For example, the stored user interaction workflows can include multiple workflows that address a given issue type, such as first workflow(s) via the webpage-based channel and second workflow(s) via the application-based channel. The one or more rules may define that the user's familiarity metric controls whether the selected user interaction workflow is from the first workflow(s) or the second workflow(s). In an example where the user's familiarity metric shows high familiarity with the webpage-based channel and low familiarity with the application-based channel, the selected user interaction workflow can be from among the first workflow(s).

The user's disposition about the issue or other suitable context can be used to select from among the first workflow(s). For example, the dialogue with the user may indicate that the user has a complex version of an issue that falls into the given issue type addressed by the first workflow(s), such as due to one or more complicating factors. In this scenario, the rules may define that a longer/more comprehensive workflow is selected from among the first workflow(s). In another example, the first workflow(s) can be associated with features or keywords, and the one or more complicating factors can be matched to the features and/or keywords of the first workflow(s) to find a best match for selection.

Intervention manager 346 can determine whether to trigger the selected user interaction workflow to shift user 402 from telephone channel 406 to alternative channel 408. In some implementations, user 402 can be prompted to accept the selected user interaction workflow when a calculated resolution metric meets a resolution criteria. For example, the calculated resolution metric can be based on the selected user interaction workflow, a history of user 402, a history of the identified user account(s), the resolved issue type, user 402's disposition about the issue, or other suitable call context. In some implementations, the resolution metric can comprise a likelihood (e.g., predicted probability) that user 402 is able to successfully resolve the issue of the determined issue type via the selected user interaction workflow. In this example, the resolution criteria can comprise a threshold probability, and the prompt to user 402 can be triggered when the calculated resolution metric meets or exceeds the threshold probability. Diagram 500 of FIG. 5 further discloses techniques to calculate the resolution metric.

The user prompt to accept the selected user interaction workflow can include one or more timing components. For example, user 402 can be offered at least two options: the option to hold for a live agent with an estimated wait time or call back time of 'X'; and the option to resolve the issue via the selected user interaction workflow with an estimated resolution time of 'Y'. In this example, the 'X' time may be longer than the 'Y' time during high call volume periods. In addition, user 402 may be informed that the user's hold/wait status (e.g., hold time or call back wait time) will be maintained while the user performs the selected user interaction workflow. Accordingly, when the performed workflow is successful at resolving the user's issue the user can save time and when the performed workflow is unsuccessful at resolving the user's issue the user will maintain the same hold/wait time. In some implementations, user 402 may be offered a priority hold/wait time if completion of the selected user interaction workflow does not resolve the issue. For example, the option to resolve the issue via the selected user interaction workflow may include an immediate or prioritized connection with a live agent (e.g., call back) if successful completion of the selected user interaction workflow does not resolve the issue.

In response to user 402 accepting the proposed user interaction workflow (e.g., via input that accepts the option), call manager 344 can transition the interaction with user 402 from telephone channel 406 to alternative channel 408. For example, the call via telephone channel 406 can be disconnected or placed on a long-term hold (e.g., hold without interaction with user 402) until completion of the accepted user interaction workflow.

Workflow manager 348 can perform the triggered user interaction workflow over alternative channel 408, such as an application-based workflow, webpage-based workflow, automated chat workflow, and the like. The guided workflow can provide instructions that guide user 402 through a series of tasks or functions to perform user account functionality. Diagram 600 of FIG. 6 further discloses techniques to perform user interaction workflow(s).

Figure 5:
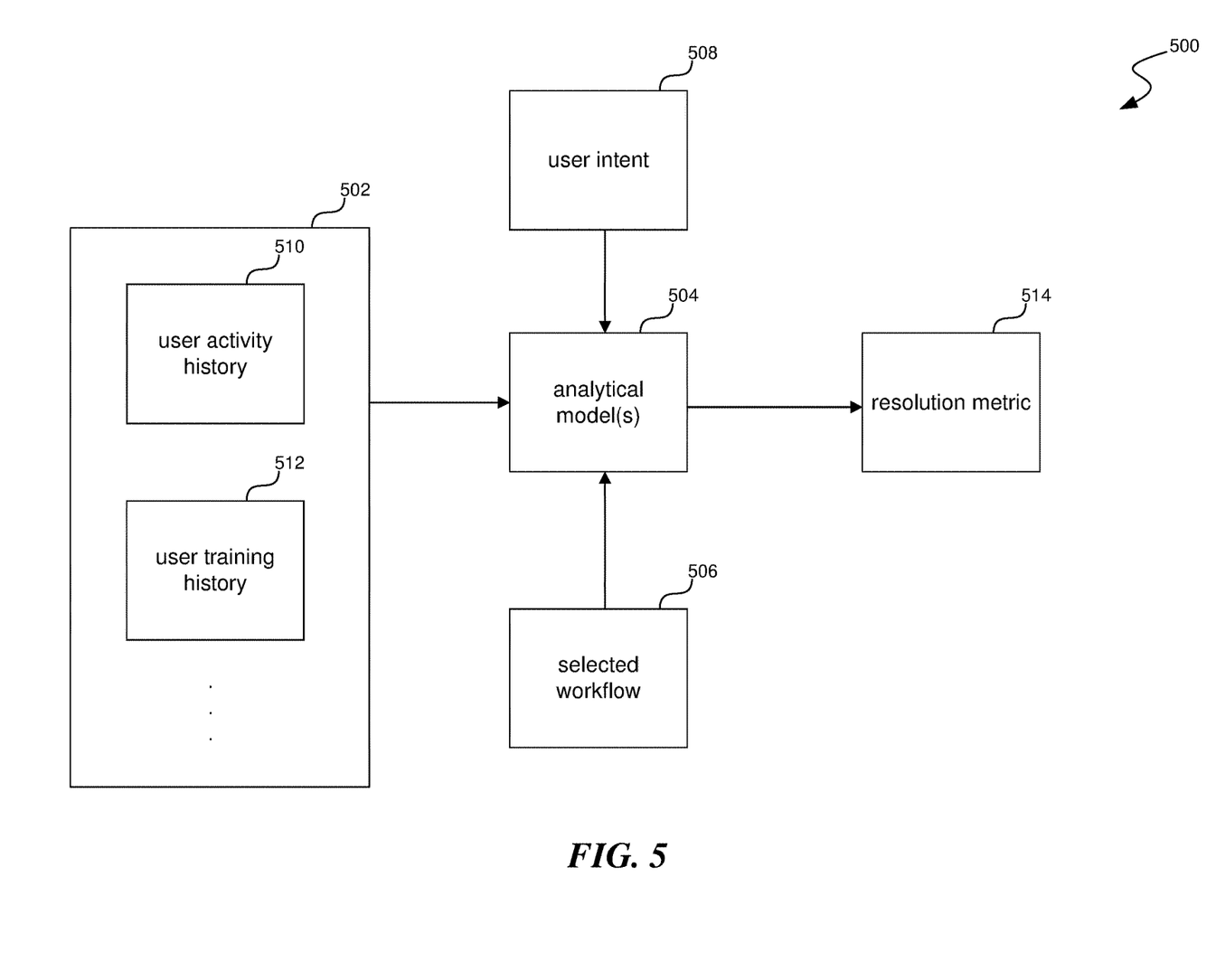
FIG. 5 is a conceptual diagram illustrating components that provide analytical model(s) information to generate resolution metric(s).

In some implementations, the user interaction workflow is triggered for user 402 based on a calculated resolution metric. FIG. 5 is a conceptual diagram 500 illustrating components that provide analytical model(s) information to generate resolution metric(s). Diagram 500 includes user source data 502, analytical model(s) 504, selected workflow 506, user intent 508, user activity history 510, user training history 512, and resolution metric 514.

For example, the resolution metric 514 can be calculated by analytical model(s) 504 using selected workflow 506 (e.g., the selected user interaction workflow), user source data 502 (e.g., user activity history 510, user training history 512, etc.), and user intent 508 (e.g., the resolved issue type, the user's disposition about the issue, complicating factors that impact the issue, etc.). In some implementations, resolution metric 514 can be a likelihood (e.g., predicted probability) that the user successfully resolves the issue of the determined issue type via performance of selected workflow 506. In this example, a resolution criteria can comprise a threshold probability, and selected workflow 506 can be triggered (e.g., a prompt to gain user acceptance can be initiated) when resolution metric 514 meets or exceeds the threshold probability. In some implementations, analytical model(s) 504 can include machine learning model(s), such as machine learning model(s) 350 of FIG. 3, or any other suitable mathematical, logical, and/or rule-based models.

Analytical model(s) 504 can receive component(s) of user source data 502 to determine the user's familiarity with performing activities and/or resolving issues via the alternative channel(s). User activity history 510 and user training history 512 can include historical data that analytical model (s) 504 can analyze to determine how effective the user will be at performing selected workflow 506. For example, user activity history 510 can represent that user's activities via alternative channels (e.g., logs of user transactions, performed tasks, and the like, that are performed via a webpage, application, etc.). User training history 512 can represent trainings the user has undergone to increase the user's familiarity with alternative channel activities. Analytical model(s) can then compare this user familiarity with the given alternative channel affiliated with the selected workflow 506. In some implementations, selected workflow 506 may correspond to an easy workflow, a moderate workflow, or a challenging workflow. Users with strong familiarity with the given alternative channel activities may be likely to complete any of these workflows, where users with little to no familiarity may be unlikely to complete a challenging workflow.

Analytical model(s) 504 can also compare the issue type and/or complicating factors related to the user issue to selected workflow 506. For example, selected workflow 506 can include features and/or natural language that describes the workflow. Analytical model(s) 504 can compare the issue type and/or the complicating factors related to the user issue (e.g., obtained via dialogue with the user) to the features/natural langue description of the workflow. When the comparison indicates high score match, it may be more likely that selected workflow 506 can resolve the user issue. When the comparison indicates a low score match, it may be unlikely that selected workflow 506 can resolve the user issue.

Analytical model(s) 504 can combine these analyses and comparisons to generate an overall likelihood (e.g., predicted probably) that the user will successfully resolve the call issue of the determined issue type via performance of selected workflow 506, or resolution metric 514. Selected workflow 506 can be any suitable workflow via a webpage-based channel, application-based channel, automated chat channel, and the like. In some implementations, the selected workflow 506 can be a guided workflow (e.g., wizard with step-by-step instructions, video, etc.) that corresponds to the user's account webpage or web/native application.

Figure 6:
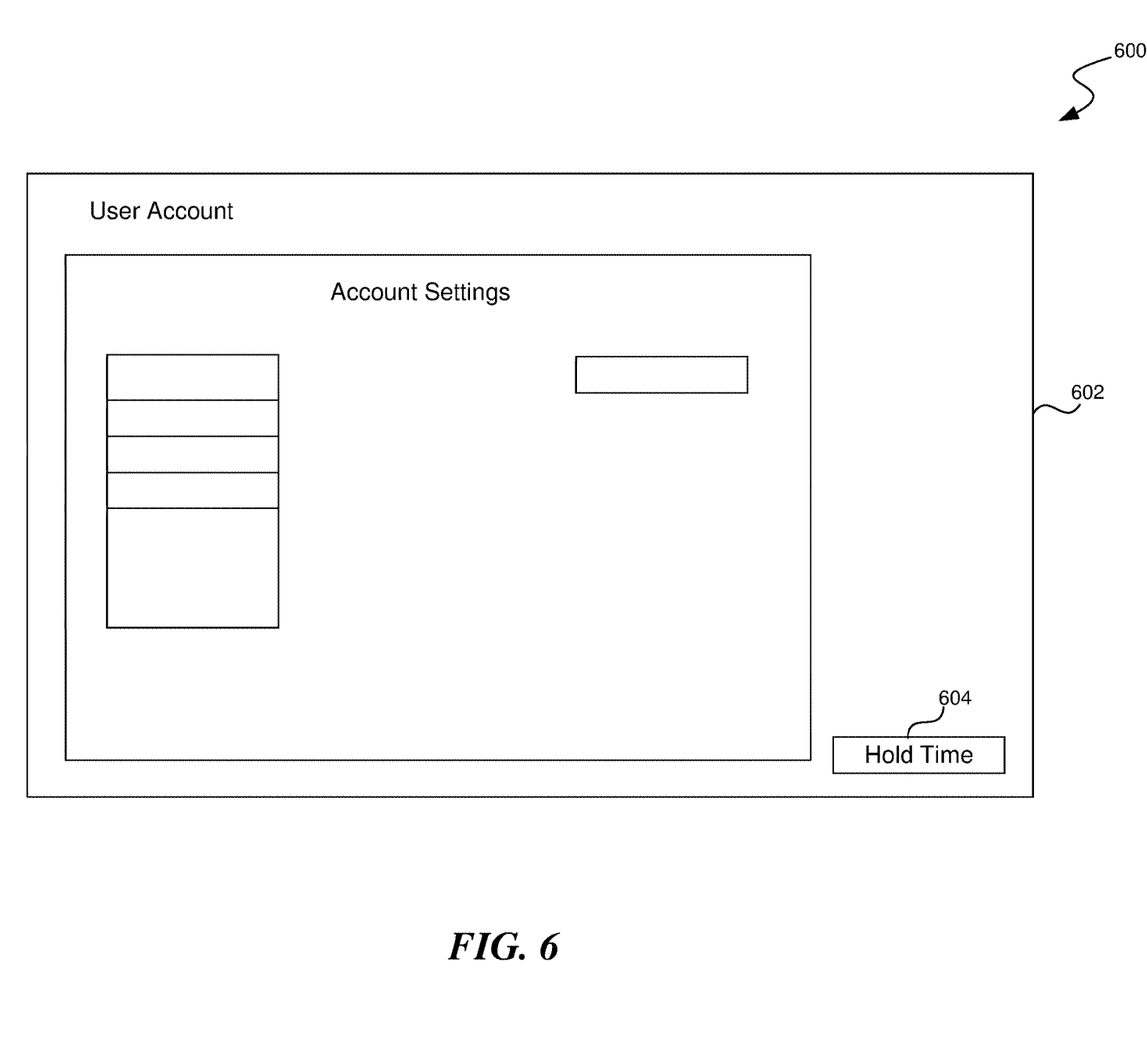
FIG. 6 is a conceptual diagram illustrating an example user workflow.

FIG. 6 is a conceptual diagram 600 illustrating an example user workflow. Diagram 600 includes user interface 602 and hold time indicator 604. User interface 602 can be a webpage interface, application interface, or any other suitable user interface. User interface 602 can display information and comprise interactive components (e.g., web forms, buttons, text entry fields, drop down menus, etc.) that the user can interact with to perform the guided workflow. For example, the user can perform account activities (or any other suitable activities) via interactions with user interface 602. User interface 602 can comprise on or more guide components (e.g., a video, a step-by-step wizard, etc.) that guides the user through the interactions of the user workflow. Accordingly, the user can perform an automated workflow (via the guide components) that is configured to resolve the user's issue. In some implementations, the user's hold/wait time can be running while the user is performing the workflow. Hold time indicator 604 can display the user's hold/wait time.

In some implementations, the user interaction workflow can instruct the user to report one or more of: a fraudulent transaction, an unfulfilled transaction associated with missing good(s) and/or service(s), and the like. For example, a user may call the account service provider about such issues due to the timeliness associated with these issues. The user interaction workflow(s) can quickly and efficiently guide the user through the steps/tasks to successfully report these transactions and resolve the user's timeliness concerns.

In some implementations, the user interaction workflow can guide the user to complete one or more initial portions of a multi-part update or application, such as a change of user information that requires supporting documentation (e.g., change of address, legal name, etc.), initial application for a loan, initial request for a new authorized user on the account, and the like. For example, such multi-part update(s) and/or application(s) may involve additional user interactions (e.g., in-person interactions and/or live agent interactions), supporting documentation, asynchronous authentication and/or confirmation of the supporting documents, or other tasks/steps. However, completing the initial portion via the user interaction workflow may provide the user guidance about how to complete the later portions, provide the user enough feedback such that the user may delay and/or opt not to continue the multi-part updates/application, and the like. Thus, the user interaction workflow can shift at least a portion of the multi-part update/application from a resource intensive channel (e.g., live agent interaction) to a more efficient channel (e.g., webpage/application channel).

Figure 7:
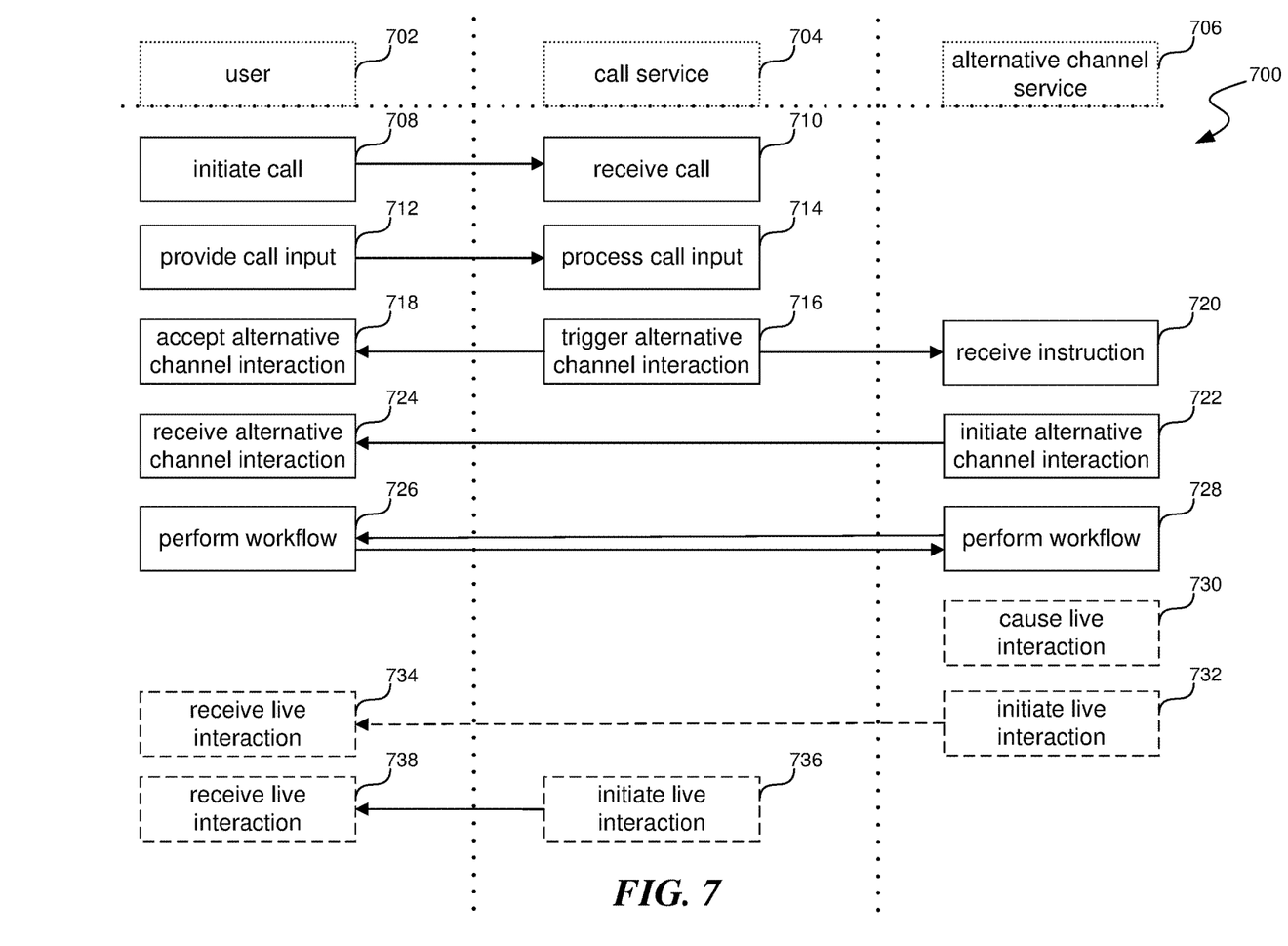
FIG. 7 is a swim lane flow diagram illustrating communications between a user, call service, and alternative channel service.

FIG. 7 is a swim lane flow diagram 700 illustrating communications between a user, call service, and alternative channel service. Diagram 700 includes user 702, call service 704, and alternative channel service 706. Blocks 708-738 represent example communications among user 702, call service 704, and channel service 706 for triggering an alternative channel interaction.

User 702 can represent a user (e.g., human user) and one or more user client devices, such as smartphone(s), laptop(s), tablet(s), desktop(s), smart home device(s), any other suitable smart device, or any other suitable client computing device. Call service 704 can represent components of a call service, such as live agent(s), automated agent(s), computing device(s) that implement a telephony system (e.g., Voice Over Internet Protocol (VoIP) system, cellular network system, Public Switched Telephone Network (PSTN) system, Plain Old Telephone System (POTS), etc.), cloud computing device(s), edge computing device(s), or any other suitable components of a call service. Alternative channel service represents components of a webpage-based guided workflow service, an application-based guided workflow service, and/or an automated chat guided workflow service, such as live agent(s), automated agent(s) (e.g., chatbots, smart digital assistants, etc.), cloud computing device(s), edge computing device(s), or any other suitable components.

User 702 can initiate a call with call service 704 at block 708, which can receive the call at block 710. Call service 704 can implement a live or automated agent that receives the user call and provides questions and/or prompts for user input. User 702 can provide call input (e.g., in response to the questions/prompts) at block 712, which is received by call service 704. Example questions/prompts include: prompts related to user identification (e.g., what is your name?, what is your account number?, what is your address on-file?, what is your PIN or other identification number?, etc.); questions related to issue identification (e.g., are you calling about [[Identified Account]]?, what issue are you call about?, we noticed you tried to perform [[Example account function]], but it was not successful, are you calling about [[Example account function]]?, etc.); and the like.

Call service 704 can process the call input from user 702 at block 714. For example, the user's input (e.g., with respect to the provided prompt) can be processed to determine call context (e.g., an issue type for the issue the user is calling about, the user's disposition about the issue, complicating factors, and other suitable user intent). Based on the call context, call service 704 can trigger an alternative channel interaction (e.g., a selected user interaction workflow) at block 716. For example, the user can accept the triggered alternative channel interaction at block 718, and alternative channel service 706 can be instructed to perform the selected user interaction workflow at block 720.

At block 722, alternative channel service 706 can initiate the alternative channel interaction, which the user can receive at block 724. For example, the alternative channel interaction can be a webpage-based guided workflow, an application-based guided workflow, an automated chat guided workflow, or any combination thereof. In some implementations, the call between user 702 and call service 704 can be terminated or placed on a long-term hold when the alternative channel interaction is triggered.

User 702 and alternative channel service 706 can perform the alternative channel workflow at blocks 726 and 728. Upon reaching a conclusion state of the workflow, the alternative channel service can: end interactions with user 702 when the user's issue is resolved via performance of the workflow; or cause a live interaction with user 702 when the user's issue is not resolved via performance of the workflow (at block 730). The conclusion state can be achieved at the end of the workflow, when user 702's hold/wait time expires, when user 702 opts to no longer continue the workflow, and the like.

The live interaction can be a live interaction via alternative channel service 706 and/or a live interaction via call service 704. For example, alternative channel service 706 can initiate an audio call, video call, or other suitable live interaction with a live agent via the alternative channel used to perform the workflow (e.g., webpage, application, etc.) at block 732. User 702 can receive this live interaction at block 734. In another example, call service 704 (based on instruction from alternative channel service 706 about the issue status upon reaching the conclusion state of the workflow) can initiate an audio call, video call, or other suitable live interaction with a live agent via a telephone call at block 736. For example, the user may have been placed on a long-term hold, and the user may be shifted from the long-term hold to a live agent interaction. In another example, a call with user 702 may have been terminated during performance of the workflow, and call service 704 can initiate a call back to user 702. User 702 can receive this live interaction at block 738.

Those skilled in the art will appreciate that the components illustrated in FIGS. 1-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
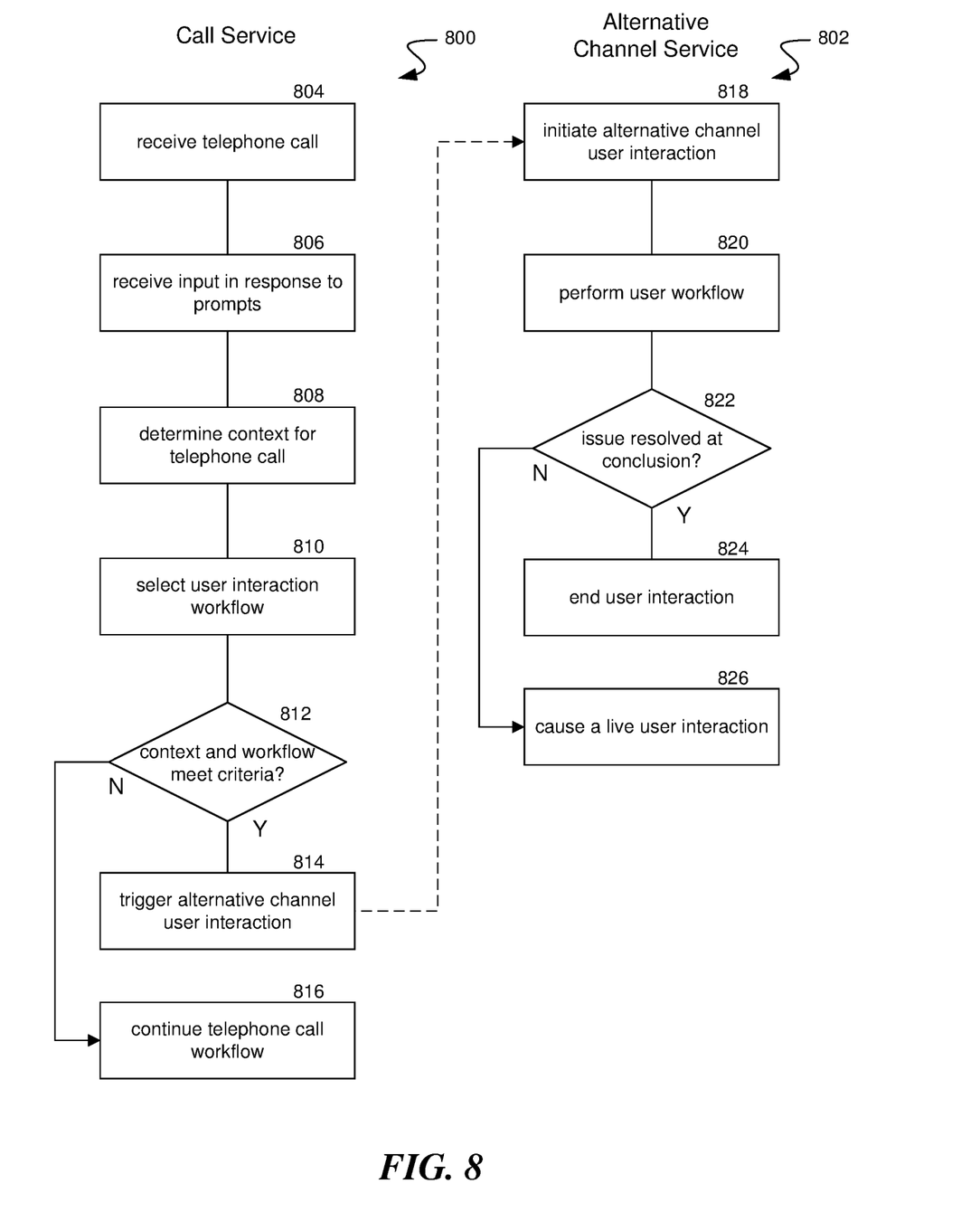
FIG. 8 is a flow diagram illustrating a process used in some implementations for triggering user interactions via an alternative channel.

FIG. 8 is a flow diagram illustrating a processes 800 and 802 used in some implementations for triggering user interactions via an alternative channel. Process 800 can be performed by a call service and process 802 can be performed by an alternative channel service. For example, the call service can comprise live agent(s), automated agent(s), computing device(s) that implement a telephony system, cloud computing device(s), edge computing device(s), or any other suitable components of a call service. The alternative channel service can comprise components of a webpage-based guided workflow service, an application-based guided workflow service, and/or an automated chat guided workflow service, such as live agent(s), automated agent(s) (e.g., chatbots, smart digital assistants, etc.), cloud computing device(s), edge computing device(s), or any other suitable components. In some implementations, process 802 can be triggered in response to receiving a user phone call at the call service.

At block 804, process 800 can receive a telephone call from a user affiliated with a user account. For example, the user may be calling an account service provider to resolve an issue with or related to the user's account(s) with the account service provider. At block 806, process 800 can receive input from the user via the telephone call, such as in response to questions or prompts. For example, the call service can perform a call workflow that prompts the user for information and receives user input with respect to the prompts. The user input can be descriptive of the user's identity, the user's account(s), the user issue related to the call, the user's disposition related to the issue, complicating factors related to the issue, and other suitable user intent.

At block 808, process 800 can determine, based on the received input, a context for the telephone call and the user account of the user. For example, the context can include an issue type for the user issue, complicating factors relevant to the issue type, the user's disposition with respect to the issue, and other suitable user intent information. One or more machine learning models can be used to generate the call context form the received input, stored account information, stored user information, and the like. In some implementations, determining the context can include processing the received input using one or more machine learning models to generate the user intent, and generating the issue type based on the user intent and a state of the user account(s).

At block 810, process 800 can select a user interaction workflow for an issue associated with the call. For example, the user interaction workflow can be selected based on the issue type, stored user information and/or stored user account information (e.g., the user's familiarity with alternative channels and issue resolution via the alternative channels), complicating factors relevant to the issue type, and the like. The selected user interaction workflow can be associated with a given alternative channel, such as a webpage-based workflow, an application-based workflow, an automated chat workflow, and the like.

At block 812, process 800 can determine whether the context meets a resolution criteria. For example, one or more analytical models (e.g., machine learning models, other suitable mathematical or logical models, etc.) can calculate a resolution criteria for the user, selected user workflow, issue type, stored user information and/or stored user account information, complicating factors relevant to the call issue, or any other suitable context. In some implementations, the stored user information comprises a history for the user (e.g., representation of webpage-based or application-based user activities that accomplish user account actions), and the resolution metric is calculated based on a similarity between the selected user interaction workflow and the history for the user. The calculated resolution metric can be a likelihood (e.g., predicted probability) that the user successfully resolves the issue of the determined issue type via performance of selected workflow.

The calculated resolution metric can be compared to a resolution criteria, or threshold probability. When the context meets the resolution criteria, process 800 can progress to block 814. When the context does not meet the resolution criteria, process 800 can progress to block 816, where a workflow for the telephone call can be continued. For example, the user can be connected with a live agent via the telephone call after a wait/hold time.

At block 814, process 800 can trigger an alternative channel user interaction. For example, the call service can instruct an alternative channel service to initiate the selected user interaction workflow with the user via the alternative channel. In some implementations, the call service can disconnect the call with the user during performance of the workflow or place the user on a long-term hold during performance of the workflow.

At block 818, process 802 can initiate the alternative channel user interaction. For example, the alternative channel user interaction can be a guided user workflow via a webpage-based channel, application-based channel, automated chat channel, and the like. In some implementations, the call service and/or user can initiate the alternative channel user interaction.

At block 820, process 802 can perform the user interaction workflow. For example, the user can perform one or more user account (or other related) activities via the alternative channel (e.g., webpage, application, chat client, etc.). The alternative channel service can implement a guided workflow such that the user activity is guided (e.g., via a video, guide components at a user interface, chat prompts, and the like) to accomplish the workflow. In some implementations, the user interaction workflow comprises a guided webpage-based workflow or a guided application-based workflow that guides the user through one or more electronic activities configured to resolve the issue type.

At block 822, process 802 can determine whether performance of the user interaction workflow resolves the issue for the user. For example, at a conclusion state of the workflow, the user can indicate whether the user's issue is resolved or unresolved. In some implementations, the conclusion state of the user interaction workflow is reached when: a) the user provides input that indicates resolution of the issue associated with the telephone call, b) the user interaction workflow is completed without input from the user that indicates resolution of the issue associated with the telephone call, c) the user's hold time expires, d) or any combination thereof. When performance of the user interaction workflow resolves the issue, process 802 can progress to block 824. When performance of the user interaction workflow does not resolve the issue, process 802 can progress to block 826.

At block 824, process 802 can end user interactions. For example, when the user explicitly provides input that indicates the user's issue is resolved, the interactions with the user can end given the reason for the interactions is nullified. In some implementations, follow-up interactions can be undertaken, such as a user survey, follow-up tasks, or any other suitable follow-up interactions.

At block 826, process 802 can cause a live user interaction. For example, when the user's issue is not resolved by complete performance of the workflow, the user opts to terminate performance of the workflow prior to its end, and/or the user's hold/wait time expires, the user's issue may be outstanding at the conclusion state of the workflow. In this example, a live interaction with the user can be initiated. For example, the live interaction can be a live audio and/or video interaction with the user. In some implementations, the initiated live audio and/or video interaction comprises: another telephone call; an audio call via the alternative channel; a video call via the alternative channel; or any combination thereof. In some implementations, the initiated live audio and/or video interaction comprises another telephone call in response to expiration of the user's hold time. A live agent can resolve the user's outstanding issue via the live audio/video interaction.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. ("some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for triggering user interactions via an alternative channel, wherein the method comprises:
    receiving a telephone call from a user affiliated with a user account;
    receiving input from the user via the telephone call;
    determining, based on the received input, a context for the telephone call and the user account, wherein the determined context comprises at least an issue type for an issue associated with the telephone call;
    selecting a candidate user interaction workflow based on the issue type;
    calculating a resolution metric based on the determined context and the candidate user interaction workflow,
        wherein the determined context includes a user history, for the user, including historical webpage-based activities and/or historical application-based activities corresponding to user account actions, and
        wherein the resolution metric is calculated by generating, using a trained machine learning model, a predicted correlation between features of the candidate user interaction workflow and features of the user history;
    comparing the resolution metric to a criteria; and
    triggering, in response to the resolution metric meeting the criteria, the candidate user interaction workflow,
        wherein the telephone call is terminated in response to the triggered candidate user interaction workflow, and
        wherein the candidate user interaction workflow is performed with the user via the alternative channel and the alternative channel comprises a webpage channel, an application channel, or any combination thereof.

2. The method of claim 1, wherein the determined context comprises a user intent, and the determining the context further comprises:
    processing the received input using one or more machine learning models to generate the user intent, wherein the received input is provided by the user in response to one or more prompts; and
    generating the issue type based on the user intent and a state of the user account.

3. The method of claim 2, wherein the resolution metric represents a predicted likelihood that the selected candidate user interaction workflow when performed by the user resolves the determined issue type, and the criteria comprises a threshold probability.

4. The method of claim 1, wherein the candidate user interaction workflow comprises a guided webpage-based workflow or a guided application-based workflow that guides the user through one or more electronic activities configured to resolve the issue type.

5. The method of claim 1,
wherein the candidate user interaction workflow is terminated when performance of the candidate user interaction workflow reaches a conclusion state, and
wherein the conclusion state of the candidate user interaction workflow is reached when the user provides input that indicates resolution of the issue associated with the telephone call or when the candidate user interaction workflow is completed without input from the user that indicates non-resolution of the issue associated with the telephone call.

6. The method of claim 1, wherein the user is provided, via the telephone call prior to the triggering of the candidate user interaction workflow, an indicator that represents the user's hold time for speaking with a live agent, and the user is displayed an indicator that represents the user's updated hold time during the performance of the candidate user interaction workflow.

7. The method of claim 6,
wherein the candidate user interaction workflow is terminated when performance of the candidate user interaction workflow reaches a conclusion state,
wherein the conclusion state is reached when: a) the user provides input that indicates resolution of the issue associated with the telephone call, b) the candidate user interaction workflow is completed without input from the user that indicates non-resolution of the issue associated with the telephone call, c) the user's hold time expires, d) or any combination thereof.

8. The method of claim 7, wherein the initiated live audio and/or video interaction comprises another telephone call in response to expiration of the user's hold time.

9. The method of claim 5, wherein the live audio and/or video interaction comprises: another telephone call; an audio call via the alternative channel; a video call via the alternative channel; or any combination thereof.

10. The method of claim 5, wherein the terminating comprises: a) ending interactions with the user when the issue associated with the telephone call is resolved at the conclusion state, or b) initiating a live audio and/or video interaction with the user when the issue associated with the telephone call remains unresolved at the conclusion state.

11. The method of claim 1, wherein the predicted correlation between features of the candidate user interaction workflow and features of the user history represents a similarity between the candidate user interaction workflow and the user history.

12. A non-transitory computer-readable storage medium storing instructions that, when executed by a computing system, cause the computing system to perform a process for triggering user interactions via an alternative channel, the process comprising:
receiving a telephone call from a user affiliated with a user account;
receiving input from the user via the telephone call;
determining, based on the received input, a context for the telephone call and the user account, wherein the determined context comprises at least an issue type for an issue associated with the telephone call;
selecting a candidate user interaction workflow based on the issue type;
calculating a resolution metric based on the determined context and the candidate user interaction workflow,
wherein the determined context includes a user history, for the user, including historical webpage-based activities and/or historical application-based activities corresponding to user account actions, and
wherein the resolution metric is calculated by generating, using a trained machine learning model, a predicted correlation between features of the candidate user interaction workflow and features of the user history;
comparing the resolution metric to a criteria; and
triggering, in response to the resolution metric meeting the criteria, the candidate user interaction workflow,
wherein the telephone call is terminated in response to the triggered candidate user interaction workflow, and
wherein the candidate user interaction workflow is performed with the user via the alternative channel and the alternative channel comprises a webpage channel, an application channel, or any combination thereof.

13. The non-transitory computer-readable storage medium of claim 12, wherein the determined context comprises a user intent, and the determining the context further comprises:
processing the received input using one or more machine learning models to generate the user intent, wherein the received input is provided by the user in response to one or more prompts; and
generating the issue type based on the user intent and a state of the user account.

14. The non-transitory computer-readable storage medium of claim 12, wherein the resolution metric represents a predicted likelihood that the selected candidate user interaction workflow when performed by the user resolves the determined issue type, and the criteria comprises a threshold probability.

15. The non-transitory computer-readable storage medium of claim 12, wherein the candidate user interaction workflow comprises a guided webpage-based workflow or a guided application-based workflow that guides the user through one or more electronic activities configured to resolve the issue type.

16. The non-transitory computer-readable storage medium of claim 12,
wherein the candidate user interaction workflow is terminated when performance of the candidate user interaction workflow reaches a conclusion state, and
wherein the conclusion state is reached when the user provides input that indicates resolution of the issue associated with the telephone call or when the user interaction workflow is completed.

17. A computing system for triggering user interactions via an alternative channel, the computing system comprising:
one or more processors; and
one or more memories storing instructions that, when executed by the one or more processors, cause the computing system to perform a process comprising:
receiving a telephone call from a user affiliated with a user account;
receiving input from the user via the telephone call;
determining, based on the received input, a context for the telephone call and the user account, wherein the determined context comprises at least an issue type for an issue associated with the telephone call;
selecting a candidate user interaction workflow based on the issue type;
calculating a resolution metric based on the determined context and the candidate user interaction workflow, wherein the determined context includes a user history, for the user, including historical webpage-based activities and/or historical application-based activities corresponding to user account actions, and
wherein the resolution metric is calculated by generating, using a trained machine learning model, a predicted correlation between features of the candidate user interaction workflow and features of the user history;
comparing the resolution metric to a criteria; and
triggering, in response to the resolution metric meeting the criteria, the candidate user interaction workflow,
wherein the telephone call is terminated in response to the triggered candidate user interaction workflow;
wherein the candidate user interaction workflow is performed with the user via the alternative channel and the alternative channel comprises a webpage channel, an application channel, or any combination thereof.

18. The non-transitory computer-readable storage medium of claim 16, wherein the live audio and/or video interaction comprises: another telephone call; an audio call via the alternative channel; a video call via the alternative channel; or any combination thereof.

19. The non-transitory computer-readable storage medium of claim 16, wherein the terminating comprises: a) ending interactions with the user when the issue associated with the telephone call is resolved at the conclusion state, or b) initiating a live audio and/or video interaction with the user when the issue associated with the telephone call remains unresolved at the conclusion state.

20. The non-transitory computer-readable storage medium of claim 12, wherein the predicted correlation between features of the candidate user interaction workflow and features of the user history represents a similarity between the candidate user interaction workflow and the user history.

\* \* \* \* \*